(12) United States Patent
Sakatani et al.

(10) Patent No.: US 6,627,579 B1
(45) Date of Patent: Sep. 30, 2003

(54) TITANIUM OXIDE, PHOTOCATALYST COMPRISING SAME AND PHOTOCATALYTIC COATING AGENT

(75) Inventors: Yoshiaki Sakatani, Niihama (JP); Hironobu Koike, Niihama (JP); Yoshiaki Takeuchi, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/593,001

(22) Filed: Jun. 13, 2000

(30) Foreign Application Priority Data

Jun. 30, 1999 (JP) .......................................... 11-185739
Oct. 7, 1999 (JP) .......................................... 11-286816

(51) Int. Cl.⁷ .......................... B01J 37/34; B01J 23/00; C09C 1/36; C01J 23/00; G01N 33/20

(52) U.S. Cl. ..................... 502/350; 502/55; 166/436; 423/598; 423/610; 436/83

(58) Field of Search .................. 502/5, 350; 106/436; 423/598, 610; 436/83

(56) References Cited

U.S. PATENT DOCUMENTS 4,012,338 A * 3/1977 Urwin .......................... 252/461
4,944,936 A * 7/1990 Lawhorne ..................... 423/612

(List continued on next page.)

FOREIGN PATENT DOCUMENTS

EP   1 125 636 A1   8/2001
JP   11-49986   *   2/1999

(List continued on next page.)

OTHER PUBLICATIONS

Kanezaki et al., "Solid–State Chemistry of Thermally Induced Yellow Colouring in Synthetic Hydrous Titanium Oxide from $TICL_3$", J. Chem. Soc. Faraday Trans., 1992, 88(24), pp. 3583–3586, Month Not Avail.

(List continued on next page.)

*Primary Examiner*—Mark L. Bell
*Assistant Examiner*—Patricia L. Hailey
(74) *Attorney, Agent, or Firm*—Fitch, Even, Tabin & Flannery (57) ABSTRACT

Titanium oxide exhibiting a superior photocatalytic activity through irradiation of a visible light as well as an ultraviolet light, and a photocatalyst and a photocatalytic coating agent including said titanium oxide, wherein said titanium oxide has a value of an index $X_1$ calculated by the following equation (I) of not more than about 0.90, and a value of an index $Y_1$ calculated by the following equation (II) of not less than 0.075, $$X_1 = B_1/A_1 \quad (I)$$

$$Y_1 = D_1/C_1, \quad (II)$$

wherein $A_1$ and $B_1$ stand for respective half-widths of peaks, which are obtained by the process consisting of the steps: (i) analyzing titanium oxide eight times according to an X-ray phtoelectron spectroscopy, (ii) obtaining an integrated spectrum of an electron state of titanium with respect to the above first analysis and the second analysis, (iii) obtaining a half-width, $A_1$, of a peak within a binding energy range of from 458 eV to 460 eV with respect to the integrated spectrum obtained in the above step (ii), and (iv) carrying out steps (ii) and (iii) with respect to the above seventh and eighth analyses to obtain a half-width, $B_1$, of a peak, and wherein $C_1$ stands for an integrated value of absorbance within a wavelength range of from 250 nm to 550 nm in measurement of an ultraviolet-visible diffuse reflection spectrum of titanium oxide, and $D_1$ stands for an integrated value of absorbance of titanium oxide within a wavelength range of from 400 nm to 550 nm.

21 Claims, 5 Drawing Sheets

U.S. PATENT DOCUMENTS

| | | | |
|---|---|---|---|
| 5,011,674 A | 4/1991 | Yoshimoto et al. | 423/610 |
| 5,630,995 A * | 5/1997 | Foulger et al. | 423/616 |
| 5,707,915 A * | 1/1998 | Taoda | 502/159 |
| 5,897,958 A * | 4/1999 | Yamada et al. | 446/474 |
| 6,306,343 B1 | 7/1999 | Sugiyama | |
| 5,981,426 A * | 11/1999 | Langford et al. | 502/309 |

FOREIGN PATENT DOCUMENTS

| | | | |
|---|---|---|---|
| JP | 11-152427 | * | 6/1999 |
| JP | 11-300273 | * | 11/1999 |
| JP | 11-333301 | | 12/1999 |
| JP | 11-333304 | | 12/1999 |
| JP | 00-129174 | * | 5/2000 |
| WO | WO98/23374 | | 6/1998 |

OTHER PUBLICATIONS

Sato, "Photocatalytic Activity of $No_x$–Doped $TIO_2$ in the Visible Light Region", Chemical Physics Letters, vol. 123, No. 1, 2, Jan. 3, 1986, pp. 126–128.

JISZ4001: Full width at half maximum (1999) no month available.

Surface Analysis Technology Sampler: X–ray Photoelectron Spectroscopy, page 203, paragraph C. Peak separation no month available. no year available.

"Solid Surface Analysis I", pp. 79–81 (Japanese Material) and English translations thereof 1995; no month available.

* cited by examiner

TITANIUM OXIDE, PHOTOCATALYST COMPRISING SAME AND PHOTOCATALYTIC COATING AGENT

FIELD OF THE INVENTION

The present invention relates to titanium oxide, which exhibits a superior photocatalytic activity under irradiation of not only an ultraviolet light but also a visible light; a photocatalyst comprising said titanium oxide as a catalyst component; and a photocatalytic coating agent comprising said photocatalyst and a solvent.

BACKGROUND OF THE INVENTION

Titanium oxide is known as a substance exhibiting an oxidation activity or reduction activity under light irradiation. Hereinafter, such a substance is referred to as a photocatalyst. A photocatalyst containing said titanium oxide is available commercially. When such a photocatalyst is contacted with, for example, bad-smelling substances present in a living space and working space, or undesired substances such as organic solvents, agricultural chemicals and surface active agents present in water, said bad-smelling substances or undesired substances can be decomposed.

However, said commercially available photocatalyst cannot exhibit a superior photocatalytic activity under visible light irradiation, although it can exhibit a superior photocatalytic activity under ultraviolet light irradiation.

SUMMARY OF THE INVENTION

Accordingly, an object of the present invention is to provide titanium oxide, which exhibits a superior photocatalytic activity under irradiation of visible light as well as ultraviolet light.

Another object of the present invention is to provide a photocatalyst comprising said titanium oxide as a catalyst component.

A further object of the present invention is to provide a photocatalytic coating agent comprising said photocatalyst and a solvent.

The present inventors have undertaken extensive studies about a photocatalyst. As a result, the present inventors have found a specific titanium oxide, which exhibits a superior photocatalytic activity under irradiation of visible light as well as ultraviolet light. And thereby the present invention has been obtained.

The present invention provides titanium oxide having a value of an index $X_1$ calculated by the following equation (I) of not more than about 0.90, and a value of an index $Y_1$ calculated by the following equation (II) of not less than about 0.075, $$X_1 = B_1/A_1 \tag{I}$$

$$Y_1 = D_1/C_1 \tag{II}$$

wherein, as to the equation (I), $A_1$ and $B_1$ stand for respective half-widths of peaks, which are obtained by the process consisting of the steps:

(i) analyzing titanium oxide eight times according to an X-ray photoelectron spectroscopy, (ii) obtaining an integrated spectrum of an electron state of titanium with respect to the above first analysis and the second analysis, (iii) obtaining a half-width, $A_1$, of a peak within a binding energy range of from 458 eV to 460 eV with respect to the integrated spectrum obtained in the above step (ii), and (iv) carrying out the same steps as the above steps (ii) and (iii) with respect to the above seventh analysis and the eighth analysis to obtain a half-width, $B_1$, of a peak, and as to the equation (II), $C_1$ stands for an integrated value of absorbance within a wavelength range of from 250 nm to 550 nm in measurement of an ultraviolet-visible diffuse reflection spectrum of titanium oxide, and $D_1$ stands for an integrated value of absorbance of titanium oxide within a wavelength range of from 400 nm to 550 nm.

Further, the present invention provides titanium oxide having a value of an index $X_1$ calculated by the following equation (I) of not more than about 0.90, a value of an index $Y_1$ calculated by the following equation (II) of not less than about 0.075, and a value of an index $Z_1$ calculated by the following equation (III) of not less than about 0.75, $$X_1 = B_1/A_1 \tag{I}$$

$$Y_1 = D_1/C_1 \tag{II}$$

$$Z_1 = Y_1 \times E_1 \tag{III}$$

wherein, as to the equation (I), $A_1$ and $B_1$ stand for respective half-widths of peaks, which are obtained by the process consisting of the steps:

(i) analyzing titanium oxide eight times according to an X-ray photoelectron spectroscopy, (ii) obtaining an integrated spectrum of an electron state of titanium with respect to the above first analysis and the second analysis, (iii) obtaining a half-width, $A_1$, of a peak within a binding energy range of from 458 eV to 460 eV with respect to the integrated spectrum obtained in the above step (ii), and (iv) carrying out the same steps as the above steps (ii) and (iii) with respect to the above seventh analysis and the eighth analysis to obtain a half-width, $B_1$, of a peak; as to the equation (II), $C_1$ stands for an integrated value of absorbance within a wavelength range of from 250 nm to 550 nm in measurement of an ultraviolet-visible diffuse reflection spectrum of titanium oxide, and $D_1$ stands for an integrated value of absorbance of titanium oxide within a wavelength range of from 400 nm to 550 nm; and as to the equation (III), $E_1$ stands for a crystallite size of titanium oxide.

Still further, the present invention provides titanium oxide having a value of an index $X_1$ calculated by the following equation (I) of not more than about 0.90, a value of an index $Y_1$ calculated by the following equation (II) of not less than about 0.075, a value of an index $Z_1$ calculated by the following equation (III) of not less than about 0.75, and a value of an index $W_1$ calculated by the following equation (IV) of not less than about 0.40, $$X_1 = B_1/A_1 \tag{I}$$

$$Y_1 = D_1/C_1 \tag{II}$$

$$Z_1 = Y_1 \times E_1 \tag{III}$$

$$W_1 = Y_1 \times E_1 \times F_1 \tag{IV}$$

wherein, as to the equation (I), $A_1$ and $B_1$ stand for respective half-widths of peaks, which are obtained by the process consisting of the steps:

(i) analyzing titanium oxide eight times according to an X-ray photoelectron spectroscopy, (ii) obtaining an integrated spectrum of an electron state of titanium with respect to the above first analysis and the second analysis, (iii) obtaining a half-width, $A_1$, of a peak within a binding energy range of from 458 eV to 460 eV with respect to the integrated spectrum obtained in the above step (ii), and (iv) carrying out the same steps as the above steps (ii) and (iii) with respect to the above seventh analysis and the eighth analysis to obtain a half-width, $B_1$, of a peak, and as to the equation (II), $C_1$ stands for an integrated value of absorbance within a wavelength range of from 250 nm to 550 nm in measurement of an ultraviolet-visible diffuse reflection spectrum of titanium oxide, and $D_1$ stands for an integrated value of absorbance of titanium oxide within a wavelength range of from 400 nm to 550 nm;

as to the equation (III), $E_1$ stands for a crystallite size of titanium oxide; and as to the equation (IV), $F_1$ stands for a degree of anatase crystallinity titanium oxide.

The present invention also provides titanium oxide having a value of an index $V_1$ calculated by the following equation (V) of not more than about 0.97, $$V_1 = H_1/G_1 \quad (V)$$

wherein, as to the equation (V), $G_1$ and $H_1$ stand for respective half-widths of peaks, which are obtained by the process consisting of the steps:

(i) analyzing titanium oxide four times according to an X-ray photoelectron spectroscopy, (ii) obtaining an integrated spectrum of an electron state of titanium with respect to the above first analysis and the second analysis, (iii) obtaining a half-width, $G_1$, of a peak within a binding energy range of from 458 eV to 460 eV with respect to the integrated spectrum obtained in the above step (ii), and (iv) carrying out the same steps as the above steps (ii) and (iii) with respect to the above third analysis and the fourth analysis to obtain a half-width, $H_1$, of a peak.

Further, the present invention provides titanium oxide having a value of an index $V_1$ calculated by the following equation (V) of not more than about 0.97, a value of an index $U_1$ calculated by the following equation (VI) of not less than about 0.14, $$V_1 = H_1/G_1 \quad (V)$$

$$U_1 = J_1/I_1 \quad (VI)$$

wherein, as to the equation (V), $G_1$ and $H_1$ stand for respective half-widths of peaks, which are obtained by the process consisting of the steps:

(i) analyzing titanium oxide four times according to an X-ray photoelectron spectroscopy, (ii) obtaining an integrated spectrum of an electron state of titanium with respect to the above first analysis and the second analysis, (iii) obtaining a half-width, $G_1$, of a peak within a binding energy range of from 458 eV to 460 eV with respect to the integrated spectrum obtained in the above step (ii), and (iv) carrying out the same steps as the above steps (ii) and (iii) with respect to the above third analysis and the fourth analysis to obtain a half-width, $H_1$, of a peak; and as to the equation (VI), $I_1$ stands for an integrated value of absorbance within a wavelength range of from 220 nm to 800 nm in measurement of an ultraviolet-visible diffuse reflection spectrum of titanium oxide, and $J_1$ stands for an integrated value of absorbance of titanium oxide within a wavelength range of from 400 nm to 800 nm.

The present invention still further provides a photocatalyst comprising titanium oxide mentioned above as a catalyst component.

In addition, the present invention provides a photocatalytic coating agent comprising said photocatalyst and a solvent.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWING

The present invention will become more fully understood from the detailed description given hereinbelow and the accompanying drawings which are given by way of illustration only, and thus are not limitative of the present invention.

DETAILED DESCRIPTION OF THE INVENTION

Titanium oxide ($TiO_2$) in accordance with the present invention has a titanium atom in a specific electron state. In order to show said electron state, the index $X_1$ calculated by the foregoing equation (I) is given, and its value is not more than about 0.90. The electron state can be explained by binding energy. In general, titanium oxide having a small value of the index $X_1$ is constituted with both a titanium atom of high binding energy electrons and a titanium atom of low binding energy electrons. When repeatedly irradiated with an X-ray, said titanium oxide is turned into titanium oxide which has a decreased titanium atom of high binding energy electrons. On the other hand, titanium oxide having a large value of the index $X_1$ is constituted with a titanium atom of no high binding energy electrons.

In order to obtain the integrated spectrum, titanium oxide is firstly analyzed through the following five steps in this order with use of an X-rayphotoelectron spectrometer, which uses carbon as a standard for determining a peak position. Here, a time required between the beginning of the first step and the completion of the fifth step is within 30 minutes, during which titanium oxide is not exposed in the air.

1st step: analyzing an electron state of titanium two times, provided that a time per analysis is 60 seconds (the first and second analyses), 2nd step: analyzing an electron state of oxygen two times, provided that a time per analysis is 56 seconds; analyzing an electron state of carbon two times, provided that a time per analysis is 80 seconds; and analyzing an electron state of titanium two times, provided that a time per analysis is 60 seconds (the third and forth analyses), 3rd step: analyzing an electron state of oxygen two times, provided that a time per analysis is 56 seconds; analyzing an electron state of carbon two times, provided that a time per analysis is 80 seconds; and analyzing an electron state of titanium two times, provided that a time per analysis is 60 seconds (the fifth and sixth analyses), 4th step: analyzing an electron state of oxygen two times, provided that a time per analysis is 56 seconds; analyzing an electron state of carbon two times, provided that a time per analysis is 80 seconds; and analyzing an electron state of titanium two times, provided that a time per analysis is 60 seconds (the seventh and eighth analyses), and 5th step: analyzing an electron state of oxygen two times, provided that a time per analysis is 56 seconds; and analyzing an electron state of carbon two times, provided that a time per analysis is 80 seconds.

After that, X-ray photoelectron spectra are obtained as to respective analyses of from the first step to the fifth step, and thereafter, respective integrated spectra of an electron state of titanium are obtained as to the X-ray photoelectron spectrum in the first analysis and that in the second analysis. Similarly, respective integrated spectra of an electron state of titanium are obtained as to the X-ray photoelectron spectrum in the seventh analysis and that in the eighth analysis.

A half-width of a peak is obtained from a peak of titanium present within a binding energy range of from 458 eV to 460 eV in the integrated spectrum obtained above. When two or more peaks are found within the binding energy range of from 458 eV to 460 eV, a half-width of a peak is obtained from the highest peak among them.

The index $Y_1$ calculated by the foregoing equation (II) shows an absorbing power of titanium oxide to visible light. A value of $Y_1$ is not less than about 0.075, preferably not less than about 0.110, and more preferably not less than about 0.145.

The integrated value of absorbance means an area surrounded by the horizontal axis and the diffuse reflection spectrum within the appointed wavelength range in the ultraviolet-visible diffuse reflection spectrum, provided that absorbance and wavelength are assigned to a vertical axis and a horizontal axis, respectively. The ultraviolet-visible diffuse reflection spectrum can be obtained by measurement using, for example, an ultraviolet-visible spectrophotometer and barium sulfate as a standard white board.

Among titanium oxide in accordance with the present invention, preferred is that having a value of the index $Z_1$ calculated by the following equation (III) of not less than about 0.75, provided that its crystallite size is assigned as $E_1$.

$$Z_1 = Y_1 \times E_1 \quad \text{(III)}$$

In this equation, $Y_1$ is an index calculated by the equation (II). More preferred value of $Z_1$ is not less than about 1.50, and most preferred value of $Z_1$ is not less than about 1.80. The crystallite size, $E_1$, can be determined by obtaining a half-width of a peak and a peak position (Bragg angle) in the strongest interference line (Miller indices: 101) of titanium oxide with use of, for example, an X-ray diffractometer, and then by calculating according to Scherrer's equation.

Among titanium oxide in accordance with the present invention, preferred is that having a value of the index $W_1$ calculated by the following equation (IV) of not less than about 0.40, provided that a crystallite size and a degree of anatase crystallinity are assigned as $E_1$ and $F_1$, respectively.

$$W_1 = Y_1 \times E_1 \times F_1 \quad \text{(IV)}$$

In this equation, $Y_1$ is an index calculated by the equation (II). More preferred value of $W_1$ is not less than about 1.30, and most preferred value of $W_1$ is not less than about 1.80. The degree of anatase crystallinity can be determined by obtaining a peak area in the strongest interference line (Miller indices: 101) of titanium oxide with use of, for example, an X-ray diffractometer.

Titanium oxide ($TiO_2$) in accordance with the present invention has a titanium atom a specific electron state. In order to show said electron state, the index $V_1$ calculated by the foregoing equation (V) is given, and its value is not more than about 0.97, preferably not more than about 0.93.

In order to obtain the integrated spectrum, titanium oxide is firstly analyzed through the following second steps in this order with use of an X-rayphotoelectron spectrometer, which uses carbon as a standard for determining a peak position. Here, a time required between the beginning of the first step and the completion of the second step is within 10 minutes, during which titanium oxide is not exposed in the air.

1st step analyzing an electron state of titanium two times, provided that a time per analysis is 60 seconds (the first and second analyses), and 2nd step: analyzing an electron state of oxygen two times, provided that a time per analysis is 56 seconds; analyzing an electron state of carbon two times, provided that a time per analysis is 80 seconds; and analyzing an electron state of titanium two times, provided that a time per analysis is 60 seconds (the third and forth analyses).

After that, X-ray photoelectron spectra are obtained as to respective analyses of from the first step to the second step, and thereafter, respective integrated spectra of an electron state of titanium are obtained as to the X-ray photoelectron spectrum in the first analysis and that in the second analysis. Similarly, respective integrated spectra of an electron state of titanium are obtained as to the X-ray photoelectron spectrum in the third analysis and that in the fourth analysis.

A half-width of a peak is obtained from a peak of titanium present within a binding energy range of from 458 eV to 460 eV in the integrated spectrum obtained above. When two or more peaks are found within the binding energy range of from 458 eV to 460 eV, a half-width of a peak is obtained from the highest peak among them.

The index $U_1$ calculated by the foregoing equation (VI) shows an absorbing power of titanium oxide to visible light. A value of $U_1$ is not less than about 0.14, preferably not less than about 0.16.

The integrated value of absorbance means an area surrounded by the horizontal axis and the diffuse reflection spectrum within the appointed wavelength range in the ultraviolet-visible diffuse reflection spectrum, provided that absorbance and wavelength are assigned to a vertical axis and a horizontal axis, respectively. The ultraviolet-visible diffuse reflection spectrum can be obtained by measurement using, for example, an ultraviolet-visible spectrophotometer and barium sulfate as a standard white board.

Furthermore, titanium dioxide in accordance with the present invention has preferably anatase phase to exhibit a superior photocatalytic activity under visible light irradiation.

Shape of titanium oxide in accordance with the present invention is not particularly limited, and may be varied depending on uses (including using processes). A particle form and a fibrous form are enumerated as examples of the shape. Titanium oxide in accordance with the present invention may be used in the form of a blend with other inorganic compounds, or in the form of a composite obtainable by heating said blend, as far as the photocatalytic activity exhibited under visible light-irradiation is not impaired. Examples of said other inorganic compounds are silica ($SiO_2$), alumina ($Al_2O_3$), zirconia ($ZrO_2$), magnesia (MgO), zinc oxide (ZnO) and iron oxide ($Fe_2O_3$, $Fe_3O_4$).

Titanium oxide in accordance with the present invention can be produced, for example, by a process comprising the steps of:
(i) dissolving a commercially available titanium compound such as titanium oxysulfate, titanium trichloride, titanium tetrachloride and titanium sulfate in water to obtain a solution,
(ii) adding a base such as ammonia, urea, an amide compound, an amidine compound and an amine compound to said solution while cooling to precipitate a solid, and
(iii) calcining said solid to obtain titanium oxide.

A photocatalyst in accordance with the present invention comprises titanium oxide of the present invention as a catalyst component. As the photocatalyst, there are enumerated a sheet-like photocatalyst obtained by extrusion-molding a mixture of titanium oxide in a particle form with a molding auxiliary; a sheet-like photocatalyst obtained by interweaving titanium oxide in a fibrous form with an organic fiber; and a photocatalyst obtained by coating or covering titanium oxide on a metal- or resin-made support. These photocatalysts may be used in combination with additives such as high molecular weight resins, molding auxiliaries, bondingagents, antistatic agents and absorbing agents. Alternatively, these photocatalysts may be used in combination with other titanium oxide exhibiting a photocatalytic activity under ultraviolet light-irradiation.

With respect to a method for using the photocatalyst in accordance with the present invention, there is enumerated a method, wherein the photocatalyst and an object to be treated such as liquid to be treated and gas to be treated are placed in a glass vessel capable of transmitting visible light, and then are irradiated with visible light of wavelength of not less than 430 nm. An irradiation time with visible light is not particularly limited, and may be selected appropriately depending on a strength of light in a light source and a kind and amount of a substance to be treated in the object to be treated.

The light source is not particularly limited, and may be capable of irradiating light containing visible light of wavelength of not less than 430 nm. Examples of the light source are sunlight, a fluorescent lamp, a halogen lamp, a black light, a xenon lamp and a mercury lamp. If desired, the light source may be equipped with an ultraviolet cut-off filter and/or an infrared cut-off filter.

A photocatalytic coating agent in accordance with the present invention comprises the photocatalyst of the present invention and a solvent. The photocatalytic coating agent can be used to facilitate coating and covering of titanium oxide on a material such as building materials and car materials, and the surface of such materials coated or covered with titanium oxide has a high photocatalytic activity. The solvent is not particularly limited. Preferred are those which evaporate easily after the coating or the covering, in other words, those which hardly remain on the resulting film. Examples thereof are water, hydrochloric acid, alcohols and ketones.

As a process for producing the photocatalytic coating agent in accordance with the present invention, there are enumerated a process wherein titanium oxide is dispersed in water to form a slurry; and a process wherein titanium oxide is subjected to peptization with acids. When dispersing titanium oxide in the solvent, if desired, a dispersing agent may be used.

According to the present invention, there is provided titanium oxide, with exhibits a superior photocatalytic activity under not only ultraviolet light-irradiation but also visible light-irradiation. This activity can be understood easily by a comparison between Example 1 and Comparative Example 1, or by a comparison between Example 2 and Comparative Example 2, or by a comparison between Example 3 and Comparative Example 3, or by a comparison between Example 4 and Comparative Example 3.

The surface of building materials or car materials, which is coated with the photocatalyst or the photocatalytic coating agent in accordance with the present invention, is capable of decomposing $NO_x$ in the air, decomposing bad-smelling substances, for example cigarette-smelling substances, present in living space and working space, decomposing undesired substances present in water such as organic solvents, agricultural chemicals and surface active agents, and further suppressing proliferation of bacteria such as radiant bacteria, algae and moulds.

EXAMPLE

The present invention is illustrated in more detail with reference to the following Examples, which are only illustrative, and are not limitative for the scope of the present invention.

The X-ray photoelectronic spectrophotometry spectrum of titanium oxide, the ultraviolet-visible diffuse reflection spectrum thereof, the crystallite size thereof, the degree of anatase crystallinity thereof and the photocatalytic activity thereof were measured according to the following methods.

1. X-ray Photoelectronic Spectrophotometry Spectrum

Measured using an apparatus of X-ray photoelectronic spectrophotometry, a trademark of XPS-7000 made by RIGAKU CORPORATION, and using the following X-ray source.

(1) Mg was electron-irradiated at output of 8 kV and 30 mA, and the generated characteristic X-ray originated in $K_\alpha$ of Mg was used.

(2) Narrow scan was used as a mode of scan.

(3) Pass E was adjusted to 10 eV.

(4) Step E was adjusted to 0.04 eV.

2. Ultraviolet and Visible Diffuse Reflection Spectrum

Measured using an ultraviolet and visible spectrophotometer, a trademark of UV-2500PC made by Shimadzu Corporation.

3. Crystallite Size

Using an X-ray diffractometer, a trademark of RAD-IIA made by RIGAKU CORPORATION, a half-width, β (radian), of a peak and a peak position 2θ (radian) in the peak of maximum intensity (Miller indices: 101) of titanium dioxide were obtained under the following conditions, followed by calculation according to the following equation (VII) (Scherrer's equation) to obtain the crystallite size, $E_1$.

| | |
|---|---|
| X-ray tubular bulb | Cu |
| Tube voltage | 40 kV |
| Tube electricity | 35 mA |
| Divergent slit | 1 degree |
| Scattering slit | 1 degree |
| Light receiving slit | 0.30 mm |
| Sampling width | 0.020 degree |
| Scanning speed | 2.00 degree/min. |
| Measuring integration frequency | 1 time |

$$E_1(\text{nm}) = K \cdot \lambda / (\beta \cos \theta) \quad \text{(VII)}$$

In this equation, K is a constant 0.94, and λ is a measuring X-ray wavelength ($CuK_\alpha$-ray: 0.154056 nm).

4. Degree of Anatase Crystallinity

Using the same apparatus and measuring conditions as used in the above measurement of the crystallite size, a peak area in the peak of maximum intensity (Miller indices: 101) of titanium oxide was obtained to calculate the degree of anatase crystallinity. Here, an anatase-type titanium oxide, a trademark of STT-65C-S manufactured by TITAN KOGYOU KABUSHIKI KAISHA, was used as an authentic sample, and its degree of anatase crystallinity was assigned as 1 (100%).

Example 1

Figure 3:
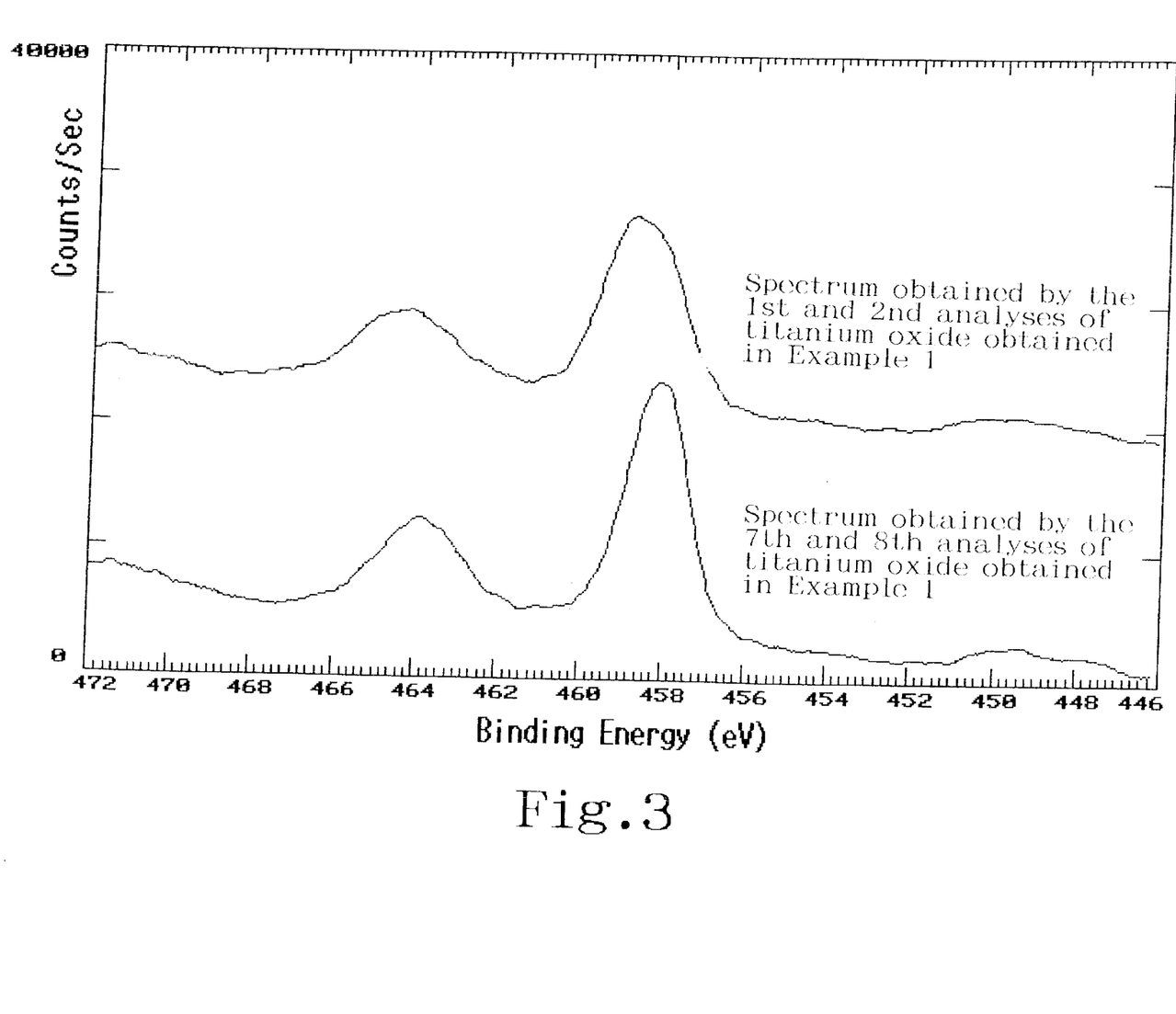
FIG. 3 shows a spectrum, which was obtained by the first and second analyses of titanium oxide obtained in Example 1 according to an X-ray photoelectron spectroscopy, and a spectrum, which was obtained by the seventh and eighth analyses of titanium oxide obtained in Example 1 according to an X-ray photoelectron spectroscopy.

In a 1-liter volume flask, 360 g of water was placed, and while stirring it, 90 g of titanium oxysulfate manufactured by SOEKAWA CHEMICAL CO., LTD. was introduced therein and mixed to obtain a solution. While cooling the solution with ice water, 101 g of an aqueous 25% ammonia solution (special grade) manufactured by Wako Pure Chemical Industries, Ltd. was added dropwise thereto over 22 minutes, thereby precipitating a solid. The solid obtained was separated by filtration and dried. The dried product obtained was calcined in air at 350° C. for 1 hour to obtain a particle titanium oxide. A crystal structure of said titanium oxide obtained was found to be an anatase-type. Physical properties of said titanium oxide and X-ray photoelectronic spectrophotometry spectrum thereof are as shown in Table 1 and FIG. 3, respectively.

Successively, in a closed Pyrex glass-made reaction vessel having a diameter of 8 cm, a height of 10 cm and a volume of about 0.5 liter, a glass-made petri dish having a diameter of 5 cm was placed. A photocatalyst consisting of only the particle titanium oxide obtained above was put on the petri dish. The inside of the reaction vessel was filled with a mixed gas of oxygen and nitrogen in a volume ratio of 1:4, and thereafter 4.5 µmol of acetaldehyde was put hermetically therein, followed by irradiation with visible light having wavelength of not less than 430 nm.

Figure 1:
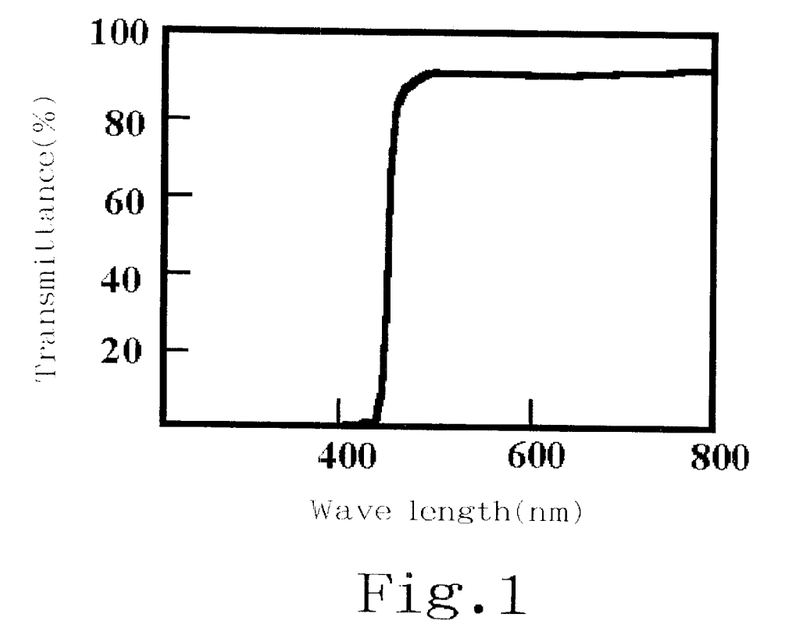
FIG. 1 shows a relationship between wavelength and transmittance of an ultraviolet cut-off filter.
Figure 2:
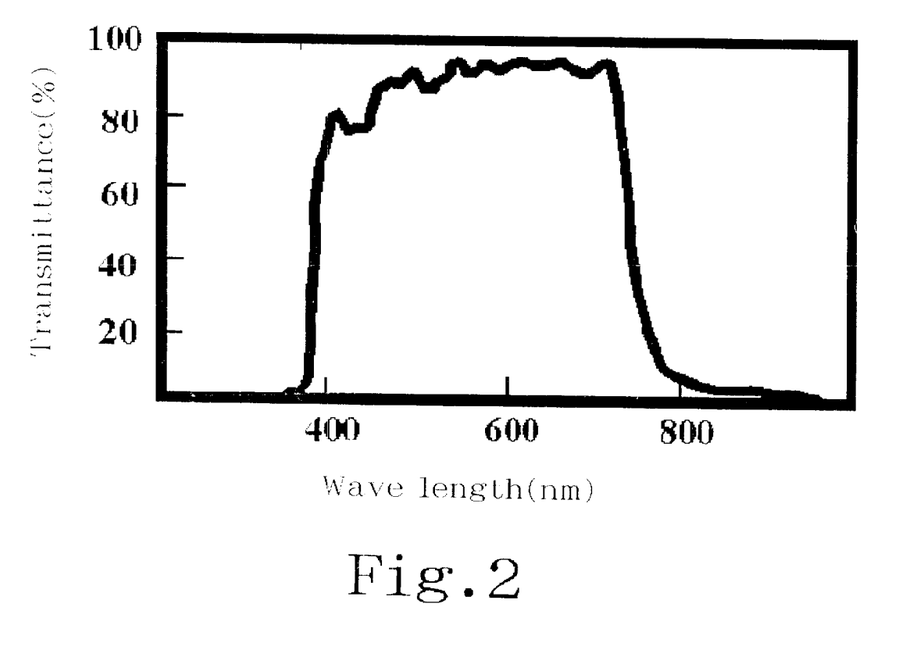
FIG. 2 shows a relationship between wavelength and transmittance of an infrared cut-off filter filter.

A lighting apparatus, a trademark of OPTICAL MODULEX SX-UI500XQ made by Ushio Inc was used as a light source. The apparatus was equipped with an ultraviolet cut-off filter, a trademark of Y-45 made by ASAHI TECHNO GLASS CORPORATION, which had spectral characteristics as shown in FIG. 1, an infrared light-cutting filter, a trademark of SUPER COLD FILTER made by Ushio Inc., which had spectral characteristics as shown in FIG. 2, and a lamp (500W xenon lamp), a trademark of UXL-500SX made by Ushio Inc. A photocatalytic activity of the photocatalyst to acetaldehyde was evaluated in terms of concentration of carbon dioxide (an oxidative decomposition product of acetaldehyde), which was generated under the irradiation, provided that said concentration was measured using a photoacoustic multi-gas monitor, 1312 type made by INNOVA. The production rate of carbon dioxide was found to be 19.36 µmol/h·g-catalyst.

Example 2

Figure 4:
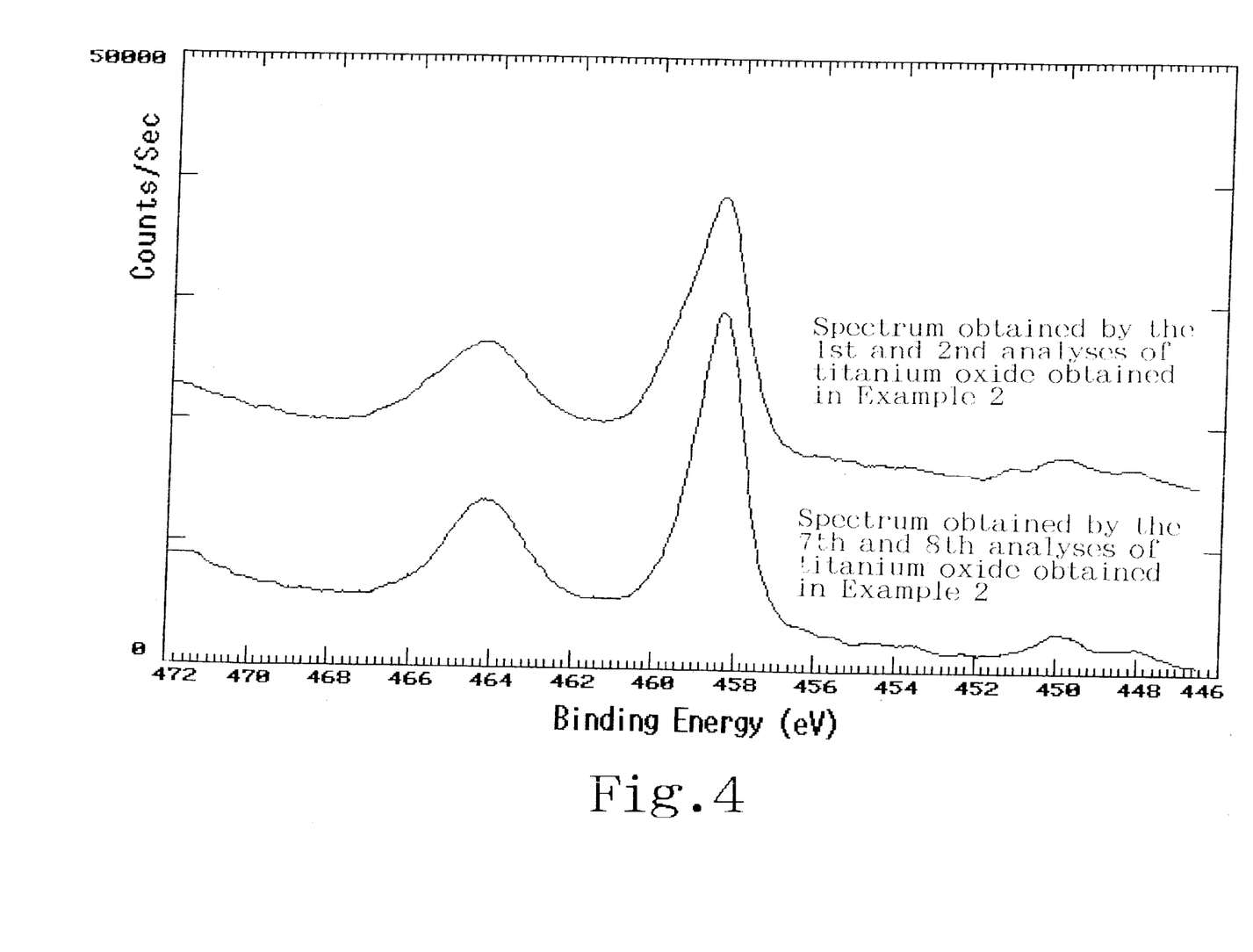
FIG. 4 shows a spectrum, which was obtained by the first and second analyses of titanium oxide obtained in Example 2 according to an X-ray photoelectron spectroscopy, and a spectrum, which was obtained by the seventh and eighth analyses of titanium oxide obtained in Example 2 according to an X-ray photoelectron spectroscopy.

In a 500 ml volume eggplant-type flask, 70 g of water was placed, and while stirring it, 30 g of titanium oxysulfate manufactured by SOEKAWA CHEMICAL CO., LTD. was introduced therein and mixed to obtain a solution. Using an evaporator (60° C.), the solution was concentrated to reach 86.9% by weight in terms of titanium oxysulfate. While cooling the concentrated solution at −25° C. in a freezer, 137 g of an aqueous 25% ammonia solution (special grade) manufactured by Wako Pure Chemical Industries, Ltd. was added dropwise thereto over 5 seconds, thereby precipitating a solid. The solid obtained was separated by filtration and dried. The dried product obtained was calcined in air at 400° C. for 1 hour to obtain a particle titanium oxide. A crystal structure of said titanium oxide obtained was found to be an anatase-type. Physical properties of said titanium oxide and X-ray photoelectronic spectrophotometry spectrum thereof are as shown in Table 1 and FIG. 4, respectively.

Successively, in a manner similar to that of Example 1, a photocatalytic activity of said titanium oxide to acetaldehyde was evaluated. The production rate of carbon dioxide was found to be 43.15 µmol/h·g-catalyst.

Figure 5:
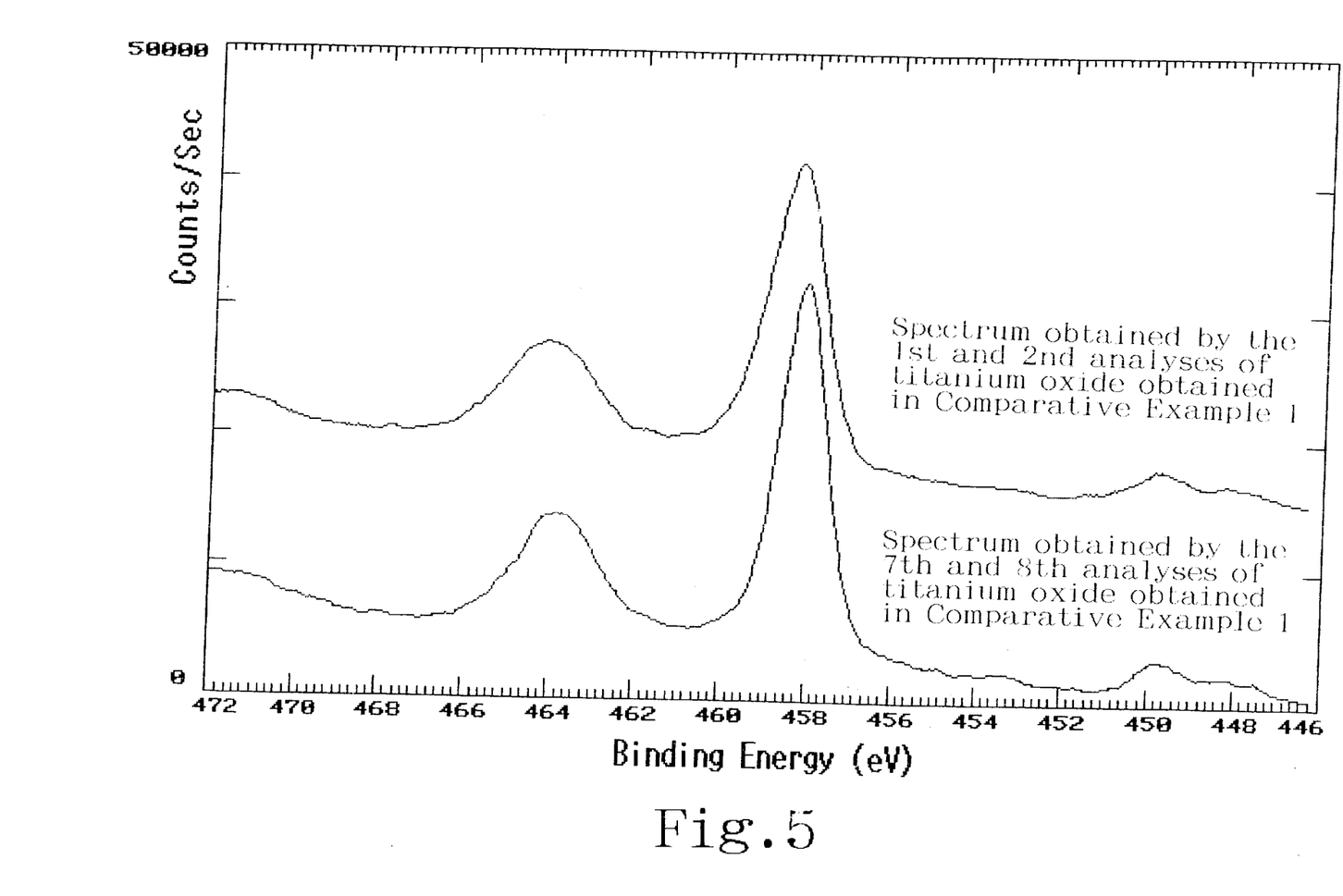
FIG. 5 shows a spectrum, which was obtained by the first and second analyses of titanium oxide obtained in Comparative Example 1 according to an X-ray photoelectron spectroscopy, and a spectrum, which was obtained by the seventh and eighth analyses of titanium oxide obtained in Comparative Example 1 according to an X-ray photoelectron spectroscopy.

Comparative Example 1

β-Titanium hydroxide manufactured by KISHIDA CHEMICAL CO., LTD. was calcined in air at 400° C. for 1 hour to obtain titanium oxide. Crystal structure of said titanium oxide was found to be an anatase-type. Physical properties of said titanium oxide and X-ray photoelectronic spectrophotometry spectrum thereof are as shown in Table 1 and FIG. 5, respectively.

Successively, in a manner similar to that of Example 1, a photocatalytic activity of said titanium oxide to acetaldehyde was evaluated. The production rate of carbon dioxide was found to be 0.93 µmol/h per g of catalyst.

Comparative Example 2

Figure 6:
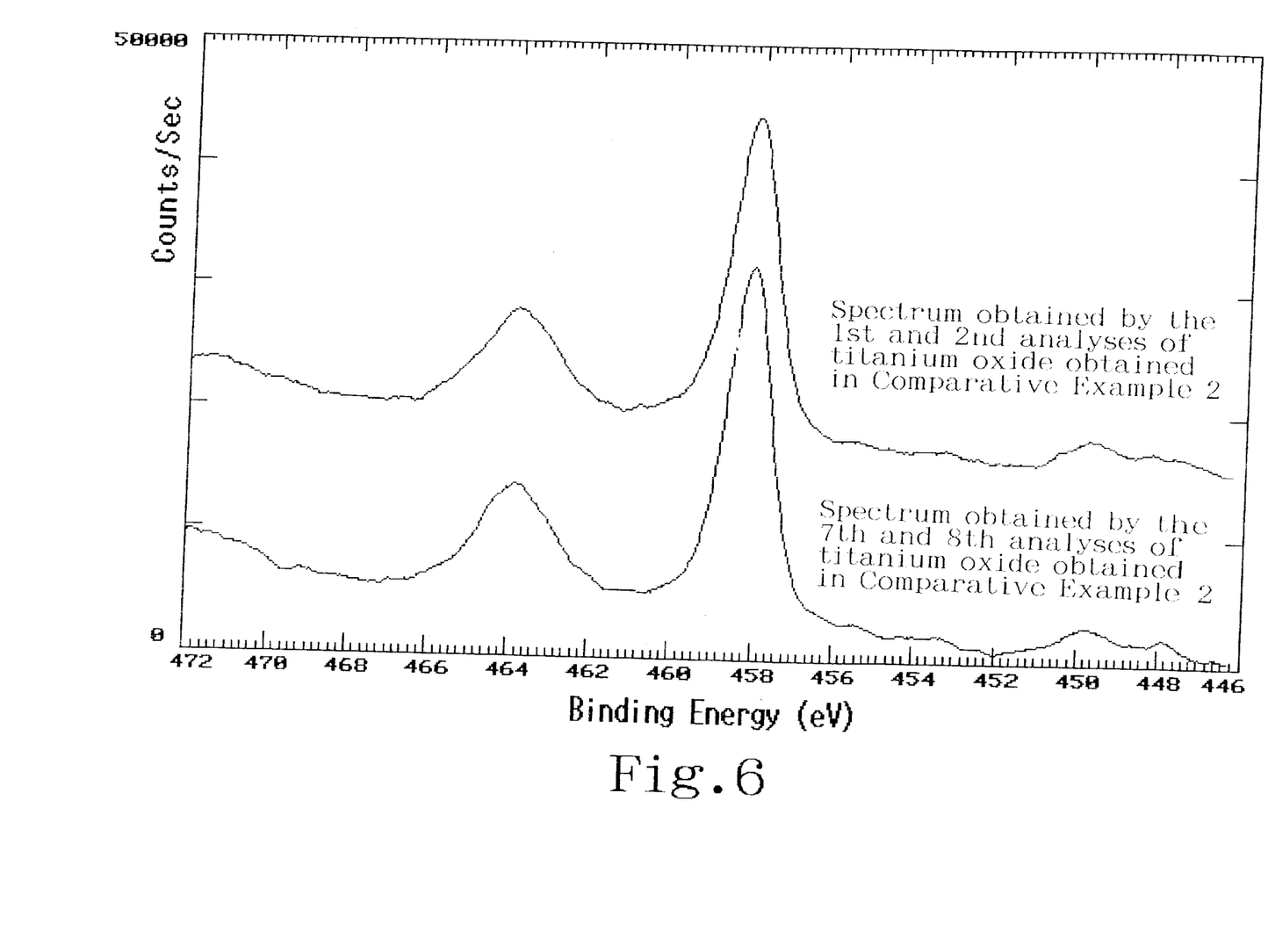
FIG. 6 shows a spectrum, which was obtained by the first and second analyses of titanium oxide obtained in Comparative Example 2 according to an X-ray photoelectron spectroscopy, and a spectrum, which was obtained by the seventh and eighth analyses of titanium oxide obtained in Comparative Example 2 according to an X-ray photoelectron spectroscopy.

Example 1 was repeated, except that a photocatalyst consisting of only titanium oxide, a trademark of P-25 manufactured by DEGUSSA CORPORATION was used. The production rate of carbon dioxide was found to be 0.0 µmol/h·g-catalyst. Physical properties of said titanium oxide and X-ray photoelectronic spectrophotometry spectrum thereof are as shown in Table 1 and FIG. 6, respectively.

Example 3

In a 0.3-liter volume flask, 100 g of a 20% titanium trichloride solution (special grade) manufactured by Wako Pure Chemical was placed, and then stirred in nitrogen atmosphere. While cooling the solution with ice water, 141 g of an aqueous 25% ammonia solution (special grade) manufactured by Wako Pure Chemical Industries, Ltd. was added dropwise thereto over 30 minutes, thereby precipitating a solid. The solid obtained was separated by filtration, washed and dried. The dried product obtained was calcined in air at 400° C. for 1 hour to obtain a particle titanium oxide. A crystal structure of said titanium oxide obtained was found to be an anatase-type. Physical properties of said titanium oxide and X-ray photoelectronic spectrophotometry spectrum thereof are as shown in Table 2 and FIG. 7, respectively.

Successively, in a closed Pyrex glass-made reaction vessel having a diameter of 8 cm, a height of 10 cm and a volume of about 0.5 liter, a glass-made petri dish having a diameter of 5 cm was placed. A lighting apparatus, a trademark of UI-502Q (starter: XB-50101AA-A) made by Ushio Inc., was used as a light source. The apparatus was equipped with an ultraviolet cut-off filter, a trademark of Y-45 made by ASAHI TECHNO GLASS CORPORATION, which had spectral characteristics as shown in FIG. 1 and a lamp (500W xenon lamp), a trademark of UXL-500D made by Ushio Inc. A photocatalyst consisting of only the particle titanium oxide obtained above was put on the petri dish. The inside of the reaction vessel was filled with a mixed gas of oxygen and nitrogen in a volume ratio of 1:4, and thereafter 38 μmol of acetaldehyde was put hermetically therein, followed by irradiation with visible light having wavelength of not less than 430 nm. A photocatalytic activity of the photocatalyst to acetaldehyde was evaluated in terms of concentration of carbon dioxide (an oxidative decomposition product of acetaldehyde), which as generated under the irradiation, provided that said concentration was measured using a gas chromatograph (Shimadzu Corporation). The product rate of carbon dioxide was found to be 23.4 μmol/h·g-catalyst.

Example 4

In a 0.3-liter volume flask, 25 g of a titanium tetrachloride solution(special grade) manufactured by Wako Pure Chemical Industries, Ltd. was placed, and then stirred. While cooling the solution with ice water, 36 g of an aqueous 25% ammonia solution (special grade) manufactured by Wako Pure Chemical Industries, Ltd. was added dropwise thereto over 5 minutes, thereby precipitating a solid. The solid obtained was separated by filtration, washed and dried. The dried product obtained was calcined in air at 400° C. for 1 hour to obtain a particle titanium oxide. A crystal structure of said titanium oxide obtained was found to be an anatase-type. Physical properties of said titanium oxide and X-ray photoelectronic spectrophotometry spectrum thereof are as shown in Table 2 and FIG. 8, respectively.

Successively, in a manner similar to that of Example 3, a photocatalytic activity of said titanium oxide to acetaldehyde was evaluated. The production rate of carbon dioxide was found to be 0.75 μmol/h·g-catalyst.

Comparative Example 3

Example 3 was repeated, except that a photocatalyst consisting of only titanium oxide, a trademark of P-25 manufactured by DEGUSSA CORPORATION was used. This titanium oxide had anatase and rutile phases. The production rate of carbon dioxide was found to be 0.3 μmol/h·g-catalyst. Physical properties of said titanium oxide and X-ray photoelectronic spectrophotometry spectrum thereof are as shown in Table 2 and FIG. 9, respectively.

Example 5

The particle titanium oxide obtained in Example 1 is dispersed in water to prepare a photocatalytic coating agent. The resulting photocatalyst coating agent is coated to car glass and then dried, and thereby it is observed that a layer of said titanium oxide is uniformly formed on the surface of car glass.

TABLE 1

|  | Example 1 | Example 2 | Comparative Example 1 | Comparative Example 2 |
|---|---|---|---|---|
| Index $X_1$ (=$B_1/A_1$) | 0.77 | 0.83 | 0.86 | 0.99 |
| Half-width $A_1$ (eV) | 2.20 | 1.71 | 1.51 | 1.34 |
| Half-width $B_1$ (eV) | 1.70 | 1.42 | 1.30 | 1.33 |
| Index $Y_1$ (=$D_1/C_1$) | 0.183 | 0.260 | 0.027 | 0.065 |
| Integrated value $C_1$ of absorbance | 208.3 | 218.9 | 184.4 | 177.9 |
| Integrated value $D_1$ of absorbance | 38.1 | 56.9 | 5.0 | 11.6 |
| Index $Z_1$ (=$Y_1 \times E_1$) | 3.36 | 3.51 | 0.20 | 1.35 |
| Crystallite size E1 (nm) | 18.37 | 13.50 | 7.49 | 20.79 |
| Index $W_1$ (=$Y_1 \times E_1 \times F_1$) | 1.11 | 2.53 | 0.13 | 0.97 |
| Degree of anatase crystallinity $F_1$ (-) | 0.331 | 0.722 | 0.630 | 0.718 |
| Production rate of $CO_2$ (μmol/h·g-catalyst) | 19.36 | 43.15 | 0.93 | 0.0 |

TABLE 2

|  | Example 3 | Example 4 | Comparative Example 3 |
|---|---|---|---|
| Peak position of the integrated spectrum of first and second analysis | 458.7 | 458.2 | 458.2 |
| Index $V_1$ (=$H_1/G_1$) | 0.64 | 0.92 | 0.99 |
| Half-width $G_1$ (eV) | 2.43 | 1.45 | 1.34 |
| Peak position of the integrated spectrum of third and fourth analysis | 458.3 | 458.2 | 458.2 |
| Half-width $H_1$ (eV) | 1.56 | 1.34 | 1.33 |
| Index $U_1$ (=$J_1/I_1$) | 0.196 | 0.119 | 0.126 |
| Integrated value $I_1$ of absorbance | 295.6 | 263.9 | 246.4 |
| Integrated value $J_1$ of absorbance | 57.8 | 31.4 | 31.0 |
| Production rate of $CO_2$ (μmol/h·g-catalyst) | 23.4 | 0.75 | 0.3 |

What is claimed is:

1. Titanium oxide having a value of an index $X_1$ calculated by the following equation (I) of not more than about 0.90, and a value of an index $Y_1$ calculated by the following equation (II) of not less than about 0.075, $$X_1 = B_1/A_1 \qquad \text{(I)}$$

$$Y_1 = D_1/C_1 \qquad \text{(II)}$$

wherein, as to the equation (I), $A_1$ and $B_1$ stand for respective half-widths of peaks, which are obtained by the process consisting of the steps:

(i) analyzing titanium oxide eight times according to an X-ray photoelectron spectroscopy, (ii) obtaining an integrated spectrum of an electron state of titanium with respect to the above first analysis and the second analysis, (iii) obtaining a half-width, $A_1$, of a peak within a binding energy range of from 458 eV to 460 eV with respect to the integrated spectrum obtained in the above step (ii), and (iv) carrying out the same steps as the above steps (ii) and (iii) with respect to the above seventh analysis and the eighth analysis to obtain a half-width, $B_1$, of a peak, and as to the equation (II), $C_1$ stands for an integrated value of absorbance within a wavelength range of from 250 nm to 550 nm in measurement of an ultraviolet-visible diffuse reflection spectrum of titanium oxide, and $D_1$ stands for an integrated value of absorbance of titanium oxide within a wavelength range of from 400 nm to 550 nm.

2. Titanium oxide having a value of an index $X_1$ calculated by the following equation (I) of not more than about 0.90, a value of an index $Y_1$ calculated by the following equation (II) of not less than about 0.075, and a value of an index $Z_1$ calculated by the following equation (III) of not less than about 0.75, $$X_1 = B_1/A_1 \quad (I)$$

$$Y_1 = D_1/C_1 \quad (II)$$

$$Z_1 = Y_1 \times E_1 \quad (III)$$

wherein, as to the equation (I), $A_1$ and $B_1$ stand for respective half-widths of peaks, which are obtained by the process consisting of the steps:

(i) analyzing titanium oxide eight times according to an X-ray photoelectron spectroscopy, (ii) obtaining an integrated spectrum of an electron state of titanium with respect to the above first analysis and the second analysis, (iii) obtaining a half-width, $A_1$, of a peak within a binding energy range of from 458 eV to 460 eV with respect to the integrated spectrum obtained in the above step (ii), and (iv) carrying out the same steps as the above steps (ii) and (iii) with respect to the above seventh analysis and the eighth analysis to obtain a half-width, $B_1$, of a peak, and as to the equation (II), $C_1$ stands for an integrated value of absorbance within a wavelength range of from 250 nm to 550 nm in measurement of an ultraviolet-visible diffuse reflection spectrum of titanium oxide, and $D_1$ stands for an integrated value of absorbance of titanium oxide within a wavelength range of from 400 nm to 550 nm; and as to the equation (III), $E_1$ stands for a crystallite size of titanium oxide.

3. Titanium oxide having a value of an index $X_1$ calculated by the following equation (I) of not more than about 0.90, a value of an index $Y_1$ calculated by the following equation (II) of not less than about 0.075, a value of an index $Z_1$ calculated by the following equation (III) of not less than about 0.75, and a value of an index $W_1$ calculated by the following equation (IV) of not less than about 0.40, $$X_1 = B_1/A_1 \quad (I)$$

$$Y_1 = D_1/C_1 \quad (II)$$

$$Z_1 = Y_1 \times E_1 \quad (III)$$

$$W_1 = Y_1 \times E_1 \times F_1 \quad (IV)$$

wherein, as to the equation (I), $A_1$ and $B_1$ stand for respective half-widths of peaks, which are obtained by the process consisting of the steps:

(i) analyzing titanium oxide eight times according to an X-ray photoelectron spectroscopy, (ii) obtaining an integrated spectrum of an electron state of titanium with respect to the above first analysis and the second analysis, (iii) obtaining a half-width, $A_1$, of a peak within a binding energy range of from 458 eV to 460 eV with respect to the integrated spectrum obtained in the above step (ii), and (iv) carrying out the same steps as the above steps (ii) and (iii) with respect to the above seventh analysis and the eighth analysis to obtain a half-width, $B_1$, of a peak, and as to the equation (II), $C_1$ stands for an integrated value of absorbance within a wavelength range of from 250 nm to 550 nm in measurement of an ultraviolet-visible diffuse reflection spectrum of titanium oxide, and $D_1$ stands for an integrated value of absorbance of titanium oxide within a wavelength range of from 400 nm to 550 nm; and as to the equation (III), $E_1$ stands for a crystallite size of titanium oxide; and as to the equation (IV), $F_1$ stands for a degree of anatase crystallinity of titanium oxide.

4. Titanium oxide having a value of an index $V_1$ calculated by the following equation (V) of not more than about 0.97, $$V_1 = H_1/G_1 \quad (V)$$

wherein, as to the equation (V), $G_1$ and $H_1$ stand for respective half-widths of peaks, which are obtained by the process consisting of the steps:

(i) analyzing titanium oxide four times according to an X-ray photoelectron spectroscopy, (ii) obtaining an integrated spectrum of an electron state of titanium with respect to the above first analysis and the second analysis, (iii) obtaining a half-width, $G_1$, of a peak within a binding energy range of from 458 eV to 460 eV with respect to the integrated spectrum obtained in the above step (ii), and (iv) carrying out the same steps as the above steps (ii) and (iii) with respect to the above third analysis and the fourth analysis to obtain a half-width, $H_1$, of a peak.

5. Titanium oxide having a value of an index $V_1$ calculated by the following equation (V) of not more than about 0.97, and a value of an index $U_1$ calculated by the following equation (VI) of not less than about 0.14, $$V_1 = H_1/G_1 \quad (V)$$

$$U_1 = J_1/I_1 \quad (VI)$$

wherein, as to the equation (V), $G_1$ and $H_1$ stand for respective half-widths of peaks, which are obtained by the process consisting of the steps:

(i) analyzing titanium oxide four times according to an X-ray photoelectron spectroscopy, (ii) obtaining an integrated spectrum of an electron state of titanium with respect to the above first analysis and the second analysis, (iii) obtaining a half-width, $G_1$, of a peak within a binding energy range of from 458 eV to 460 eV with respect to the integrated spectrum obtained in the above step (ii), and (iv) carrying out the same steps as the above steps (ii) and (iii) with respect to the above third analysis and the fourth analysis to obtain a half-width, $H_1$, of a peak, and as to the equation (VI), $I_1$ stands for an integrated value of absorbance within a wavelength range of from 220 nm to 800 nm in measurement of an ultraviolet-visible diffuse reflection spectrum of titanium oxide, and $J_1$ stands for an integrated value of absorbance of titanium oxide within a wavelength range of from 400 nm to 800 nm.

6. Titanium oxide according to claim 4, wherein said titanium has anatase phase.

7. Titanium oxide according to claim 5, wherein said titanium has anatase phase.

8. A photocatalyst comprising titanium oxide as a catalyst component, which has a value of an index $X_1$ calculated by the following equation (I) of not more than about 0.90, and a value of an index $Y_1$ calculated by the following equation (II) of not less than about 0.075, $$X_1 = B_1/A_1 \quad (I)$$

$$Y_1 = D_1/C_1 \quad (II)$$

wherein, as to the equation (I), $A_1$ and $B_1$ stand for respective half-widths of peaks, which are obtained by the process consisting of the steps:

(i) analyzing titanium oxide eight times according to an X-ray photoelectron spectroscopy, (ii) obtaining an integrated spectrum of an electron state of titanium with respect to the above first analysis and the second analysis, (iii) obtaining a half-width, $A_1$, of a peak within a binding energy range of from 458 eV to 460 eV with respect to the integrated spectrum obtained in the above step (ii), and (iv) carrying out the same steps as the above steps (ii) and (iii) with respect to the above seventh analysis and the eighth analysis to obtain a half-width, $B_1$, of a peak, and as to the equation (II), $C_1$ stands for an integrated value of absorbance within a wavelength range of from 250 nm to 550 nm in measurement of an ultraviolet-visible diffuse reflection spectrum of titanium oxide, and $D_1$ stands for an integrated value of absorbance of titanium oxide within a wavelength range of from 400 nm to 550 nm.

9. A photocatalyst comprising titanium oxide as a catalyst component, which has a value of an index $X_1$ calculated by the following equation (I) of not more than about 0.90, a value of an index $Y_1$ calculated by the following equation (II) of not less than about 0.075, and a value of an index $Z_1$ calculated by the following equation (III) of not less than about 0.75, $$X_1 = B_1/A_1 \quad (I)$$

$$Y_1 = D_1/C_1 \quad (II)$$

$$Z_1 = Y_1 \times E_1 \quad (III)$$

wherein, as to the equation (I), $A_1$ and $B_1$ stand for respective half-widths of peaks, which are obtained by the process consisting of the steps:

(i) analyzing titanium oxide eight times according to an X-ray photoelectron spectroscopy, (ii) obtaining an integrated spectrum of an electron state of titanium with respect to the above first analysis and the second analysis, (iii) obtaining a half-width, $A_1$, of a peak within a binding energy range of from 458 eV to 460 eV with respect to the integrated spectrum obtained in the above step (ii), and (iv) carrying out the same steps as the above steps (ii) and (iii) with respect to the above seventh analysis and the eighth analysis to obtain a half-width, $B_1$, of a peak, and as to the equation (II), $C_1$ stands for an integrated value of absorbance within a wavelength range of from 250 nm to 550 nm in measurement of an ultraviolet-visible diffuse reflection spectrum of titanium oxide, and $D_1$ stands for an integrated value of absorbance of titanium oxide within a wavelength range of from 400 nm to 550 nm; and as to the equation (III), $E_1$ stands for a crystallite size of titanium oxide.

10. A photocatalyst comprising titanium oxide as a catalyst component, which has a value of an index $X_1$ calculated by the following equation (I) of not more than about 0.90, a value of an index $Y_1$ calculated by the following equation (II) of not less than about 0.075, a value of an index $Z_1$ calculated by the following equation (III) of not less than about 0.75, and a value of an index $W_1$ calculated by the following equation (IV) of not less than about 0.40, $$X_1 = B_1/A_1 \quad (I)$$

$$Y_1 = D_1/C_1 \quad (II)$$

$$Z_1 = Y_1 \times E_1 \quad (III)$$

$$W_1 = Y_1 \times E_1 \times F_1 \quad (IV)$$

wherein, as to the equation (I), $A_1$ and $B_1$ stand for respective half-widths of peaks, which are obtained by the process consisting of the steps:

(i) analyzing titanium oxide eight times according to an X-ray photoelectron spectroscopy, (ii) obtaining an integrated spectrum of an electron state of titanium with respect to the first analysis and the second analysis, (iii) obtaining a half-width, $A_1$, of a peak within a binding energy range of from 458 eV to 460 eV with respect to the integrated spectrum obtained in the above step (ii), and (iv) carrying out the same steps as the above steps (ii) and (iii) with respect to the above seventh analysis and the eighth analysis to obtain a half-width, $B_1$, of a peak, and as to the equation (II), $C_1$ stands for an integrated value of absorbance within a wavelength range of from 250 nm to 550 nm in measurement of an ultraviolet-visible diffuse reflection spectrum of titaniun. oxide, and $D_1$ stands for an integrated value of absorbance of titanium oxide within a wavelength range of from 400 nm to 550 nm; and as to the equation (III), $E_1$ stands for a crystallite size of titanium oxide; and as to the equation (IV), $F_1$ stands for a degree of anatase crystallinity of titanium oxide.

11. A photocatalyst comprising titanium oxide as a catalyst component, which has a value of an index $V_1$ calculated by the following equation (V) of not more than about 0.97, $$V_1 = H_1/G_1 \quad (V)$$

wherein, as to the equation (V), $G_1$ and $H_1$ stand for respective half-widths of peaks, which are obtained by the process consisting of the steps:

(i) analyzing titanium oxide four times according to an X-ray photoelectron spectroscopy, (ii) obtaining an integrated spectrum of an electron state of titanium with respect to the above first analysis and the second analysis, (iii) obtaining a half-width, $G_1$, of a peak within a binding energy range of from 458 eV to 460 eV with respect to the integrated spectrum obtained in the above step (ii), and (iv) carrying out the same steps as the above steps (ii) and (iii) with respect to the above third analysis and the fourth analysis to obtain a half-width, $H_1$, of a peak.

12. A photocatalyst comprising titanium oxide as a catalyst component, which has a value of an index $V_1$ calculated by the following equation (V) of not more than about 0.97, and a value of an index $U_1$ calculated by the following equation (VI) of not less than about 0.14, $$V_1 = H_1/G_1 \tag{V}$$

$$U_1 = J_1/I_1 \tag{VI}$$

wherein, as to the equation (V), $G_1$ and $H_1$ stand for respective half-widths of peaks, which are obtained by the process consisting of the steps:

(i) analyzing titanium oxide four times according to an X-ray photoelectron spectroscopy, (ii) obtaining an integrated spectrum of an electron state of titanium with respect to the above first analysis and the second analysis, (iii) obtaining a half-width, $G_1$, of a peak within a binding energy range of from 458 eV to 460 eV with respect to the integrated spectrum obtained in the above step (ii), and (iv) carrying out the same steps as the above steps (ii) and (iii) with respect to the above third analysis and the fourth analysis to obtain a half-width, $H_1$, of a peak, and as to the equation (VI), $I_1$ stands for an integrated value of absorbance within a wavelength range of from 220 nm to 800 nm in measurement of an ultraviolet-visible diffuse reflection spectrum of titanium oxide, and $J_1$ stands for an integrated value of absorbance of titanium oxide within a wavelength range of from 400 nm to 800 nm.

13. A photocatalyst comprising titanium oxide as a catalyst component, which has a value of an index $V_1$ calculated by the following equation (V) of not more than about 0.97, and has anatase phase, $$V_1 = H_1/G_1 \tag{V}$$

wherein, as to the equation (V), $G_1$ and $H_1$ stand for respective half-widths of peaks, which are obtained by the process consisting of the steps:

(i) analyzing titanium oxide four times according to an X-ray photoelectron spectroscopy, (ii) obtaining an integrated spectrum of an electron state of titanium with respect to the above first analysis and the second analysis, (iii) obtaining a half-width, $G_1$, of a peak within a binding energy range of from 458 eV to 460 eV with respect to the integrated spectrum obtained in the above step (ii), and (iv) carrying out the same steps as the above steps (ii) and (iii) with respect to the above third analysis and the fourth analysis to obtain a half-width, $H_1$, of a peak.

14. A photocatalyst comprising titanium oxide as a catalyst component, which has a value of an index $V_1$ calculated by the following equation (V) of not more than about 0.97, and a value of an index $U_1$ calculated by the following equation (VI) of not less than about 0.14, and which has anatase phase, $$V_1 = H_1/G_1 \tag{V}$$

$$U_1 = J_1/I_1 \tag{VI}$$

wherein, as to the equation (V), $G_1$ and $H_1$ stand for respective half-widths of peaks, which are obtained by the process consisting of the steps:

(i) analyzing titanium oxide four times according to an X-ray photoelectron spectroscopy, (ii) obtaining an integrated spectrum of an electron state of titanium with respect to the first analysis and the second analysis, (iii) obtaining a half-width, $G_1$, of a peak within a binding energy range of from 458 eV to 460 eV with respect to the integrated spectrum obtained in the above step (ii), and (iv) carrying out the same steps as the above steps (ii) and (iii) with respect to the above third analysis and the fourth analysis to obtain a half-width, $H_1$, of a peak, and as to the equation (VI), $I_1$ stands for an integrated value of absorbance within a wavelength range of from 220 nm to 800 nm in measurement of an ultraviolet-visible diffuse reflection spectrum of titanium oxide, and $J_1$ stands for an integrated value of absorbance of titanium oxide within a wavelength range of from 400 nm to 800 nm.

15. A photocatalytic coating agent, which comprises:

(i) a solvent; and (ii) a photocatalyst comprising titanium oxide as a catalyst component, which has a value of an index $X_1$ calculated by the following equation (I) of not more than about 0.90, and a value of an index $Y_1$ calculated by the following equation (II) of not less than about 0.075, $$X_1 = B_1/A_1 \tag{I}$$

$$Y_1 = D_1/C_1 \tag{II}$$

wherein, as to the equation (I), $A_1$ and $B_1$ stand for respective half-widths of peaks, which are obtained by the process consisting of the steps:

(i) analyzing titanium oxide eight times according to an X-ray photoelectron spectroscopy, (ii) obtaining an integrated spectrum of an electron state of titanium with respect to the above first analysis and the second analysis, (iii) obtaining a half-width, $A_1$, of a peak within a binding energy range of from 458 eV to 460 eV with respect to the integrated spectrum obtained in the above step (ii), and (iv) carrying out the same steps as the above steps (ii and iii) with respect to the above seventh analysis and the eighth analysis to obtain a half-width, $B_1$, of a peak, and as to the equation (II), $C_1$ stands for an integrated value of absorbance within a wavelength range of from 250 nm to 550 nm in measurement of an ultraviolet-visible diffuse reflection spectrum of titanium oxide, and $D_1$ stands for an integrated value of absorbance of titanium oxide within a wavelength range of from 400 nm to 550 nm.

16. A photocatalytic coating agent, which comprises:

(i) a solvent; and (ii) a photocatalyst comprising titanium oxide as a catalyst component, which has a value of an index $X_1$ calculated by the following equation (I) of not more than about 0.90, a value of an index $Y_1$ calculated by the following equation (II) of not less than about 0.075, and a value of an index $Z_1$ calculated by the following equation (III) of not less than about 0.75, $$X_1 = B_1/A_1 \quad (I)$$

$$Y_1 = D_1/C_1 \quad (II)$$

$$Z_1 = Y_1 \times E_1 \quad (III)$$

wherein, as to the equation (I), $A_1$ and $B_1$ stand for respective half-widths of peaks, which are obtained by the process consisting of the steps:

(i) analyzing titanium oxide eight times according to an X-ray photoelectron spectroscopy, (ii) obtaining an integrated spectrum of an electron state of titanium with respect to the above first analysis and the second analysis, (iii) obtaining a half-width, $A_1$, of a peak within a binding energy range of from 458 eV to 460 eV with respect to the integrated spectrum obtained in the above step (ii), and (iv) carrying out the same steps as the above steps (ii) and (iii) with respect to the above seventh analysis and the eighth analysis to obtain a half-width, $B_1$, of a peak, and as to the equation (II), $C_1$ stands for an integrated value of absorbance within a wavelength range of from 250 nm to 550 nm in measurement of an ultraviolet-visible diffuse reflection spectrum of titanium oxide, and $D_1$ stands for an integrated value of absorbance of titanium oxide within a wavelength range of from 400 nm to 550 nm; and as to the equation (III), $E_1$ stands for a crystallite size of titanium oxide.

17. A photocatalytic coating agent, which comprises:

(i) a solvent; and (ii) a photocatalyst comprising titanium oxide as a catalyst component, which has a value of an index $X_1$ calculated by the following equation (I) of not more than about 0.90, a value of an index $Y_1$ calculated by the following equation (II) of not less than about 0.075, a value of an index $Z_1$ calculated by the following equation (III) of not less than about 0.75, and a value of an index $W_1$ calculated by the following equation (IV) of not less than about 0.40, $$X_1 = B_1/A_1 \quad (I)$$

$$Y_1 = D_1/C_1 \quad (II)$$

$$Z_1 = Y_1 \times E_1 \quad (III)$$

$$W_1 = Y_1 \times E_1 \times F_1 \quad (IV)$$

wherein, as to the equation (I), $A_1$ and $B_1$ stand for respective half-widths of peaks, which are obtained by the process consisting of the steps:

(i) analyzing titanium oxide eight times according to an X-ray photoelectron spectroscopy, (ii) obtaining an integrated spectrum of an electron state of titanium with respect to the above first analysis and the second analysis, (iii) obtaining a half-width, $A_1$, of a peak within a binding energy range of from 458 eV to 460 eV with respect to the integrated spectrum obtained in the above step (ii), and (iv) carrying out the same steps as the above steps (ii) and (iii) with respect to the above seventh analysis and the eighth analysis to obtain a half-width, $B_1$, of a peak, and as to the equation (II), $C_1$ stands for an integrated value of absorbance within a wavelength range of from 250 nm to 550 nm in measurement of an ultraviolet-visible diffuse reflection spectrum of titanium oxide, and $D_1$ stands for an integrated value of absorbance of titanium oxide within a wavelength range of from 400 nm to 550 nm; and as to the equation (III), $E_1$ stands for a crystallite size of titanium oxide; and as to the equation (IV), $F_1$ stands for a degree of anatase crystallinity of titanium oxide.

18. A photocatalytic coating agent, which comprises:

(i) a solvent; and (ii) a photocatalyst comprising titanium oxide as a catalyst component, which has a value of an index $V_1$ calculated by the following equation (V) of not more than about 0.97, $$V_1 = H_1/G_1 \quad (V)$$

wherein, as to the equation (V), $G_1$ and $H_1$ stand for respective half-widths of peaks, which are obtained by the process consisting of the steps:

(i) analyzing titanium oxide four times according to an X-ray photoelectron spectroscopy, (ii) obtaining an integrated spectrum of an electron state of titanium with respect to the above first analysis and the second analysis, (iii) obtaining a half-width, $G_1$, of a peak within a binding energy range of from 458 eV to 460 eV with respect to the integrated spectrum obtained in the above step (ii), and (iv) carrying out the same steps as the above steps (ii) and (iii) with respect to the above third analysis and the fourth analysis to obtain a half-width, $H_1$, of a peak.

19. A photocatalytic coating agent, which comprises:

(i) a solvent: and (ii) a photocatalyst comprising titanium oxide as a catalyst component, which has a value of an index $V_1$ calculated by the following equation (V) of not more than about 0.97, and a value of an index $U_1$ calculated by the following equation (VI) of not less than about 0.14, $$V_1 = H_1/G_1 \quad (V)$$

$$U_1 = J_1/I_1 \quad (VI)$$

wherein, as to the equation (V), $G_1$ and $H_1$ stand for respective half-widths of peaks, which are obtained by the process consisting of the steps:

(i) analyzing titanium oxide four times according to an X-ray photoelectron spectroscopy, (ii) obtaining an integrated spectrum of an electron state of titanium with respect to the above first analysis and the second analysis, (iii) obtaining a half-width, $G_1$, of a peak within a binding energy range of from 458 eV to 460 eV with respect to the integrated spectrum obtained in the above step (ii), and (iv) carrying out the same steps as the above steps (ii) and (iii) with respect to the above third analysis and the fourth analysis to obtain a half-width, $H_1$, of a peak, and as to the equation (VI), $I_1$ stands for an integrated value of absorbance within a wavelength range of from 220 nm to 800 nm in measurement of an ultraviolet-visible diffuse reflection spectrum of titanium oxide, and $J_1$ stands for an integrated value of absorbance of titanium oxide within a wavelength range of from 400 nm to 800 nm.

20. A photocatalytic coating agent, which comprises:
    (i) a solvent; and
    (ii) a photocatalyst comprising titanium oxide as a catalyst component, which has a value of an index $V_1$ calculated by the following equation (V) of not more than about 0.97, and has anatase phase, $$V_1 = H_1/G_1 \tag{V}$$

wherein, as to the equation (V), $G_1$ and $H_1$ stand for respective half-widths of peaks, which are obtained by the process consisting of the steps:
   (i) analyzing titanium oxide four times according to an X-ray photoelectron spectroscopy,
   (ii) obtaining an integrated spectrum of an electron state of titanium with respect to the above first analysis and the second analysis,
   (iii) obtaining a half-width, $G_1$, of a peak within a binding energy range of from 458 eV to 460 eV with respect to the integrated spectrum obtained in the above step (ii), and
   (iv) carrying out the same steps as the above steps (ii) and (iii) with respect to the above third analysis and the fourth analysis to obtain a half-width, $H_1$, of a peak.

21. A photocatalytic coating agent, which comprises:
    (i) a solvent; and
    (ii) a photocatalyst comprising titanium oxide as a catalyst component, which has a value of an index $V_1$ calculated by the following equation (V) of not more than about 0.97, and a value of an index $U_1$ calculated by the following equation (VI) of not less than about 0.14, and which has anatase phase, $$V_1 = H_1/G_1 \tag{V}$$

$$U_1 = J_1/I_1 \tag{VI}$$

wherein, as to the equation (V), $G_1$ and $H_1$ stand for respective half-widths of peaks, which are obtained by the process consisting of the steps:
   (i) analyzing titanium oxide four times according to an X-ray photoelectron spectroscopy,
   (ii) obtaining an integrated spectrum of an electron state of titanium with respect to the above first analysis and the second analysis,
   (iii) obtaining a half-width, $G_1$, of a peak within a binding energy range of from 458 eV to 460 eV with respect to the integrated spectrum obtained in the above step (ii), and
   (iv) carrying out the same steps as the above steps (ii) and (iii) with respect to the above third analysis and the fourth analysis to obtain a half-width, $H_1$, of a peak, and as to the equation (VI), $I_1$ stands for an integrated value of absorbance within a wavelength range of from 220 nm to 800 nm in measurement of an ultraviolet-visible diffuse reflection spectrum of titanium oxide, and $J_1$ stands for an integrated value of absorbance of titanium oxide within a wavelength range of from 400 nm to 800 nm.

* * * * *

UNITED STATES PATENT AND TRADEMARK OFFICE
CERTIFICATE OF CORRECTION

PATENT NO. : 6,627,579 B1
DATED : September 30, 2003
INVENTOR(S) : Sakatani et al.

It is certified that error appears in the above-identified patent and that said Letters Patent is hereby corrected as shown below:

Column 13,
Line 55, "in dex" should read -- index --.

Column 14,
Lines 29 and 50, "0.97", for each occurrence, should read -- 0.93 --.

Column 16,
Line 50, "titaniun. oxide" should read -- titanium oxide --;
Line 59, "0.97" should be changed to -- 0.93 --.

Column 17,
Lines 13, 45 and 67, "0.97", for each occurrence, should read -- 0.93 --.

Column 18,
Line 54, "(ii" should read -- (ii) --.

Column 20,
Lines 17 and 42, "0.97", for each occurrence, should read -- 0.93 --.

Column 21,
Line 9, "0.97" should read -- 0.93 --.

Column 22,
Line 1, "0.97" should read -- 0.93 --.

Signed and Sealed this

Twenty-eighth Day of September, 2004

JON W. DUDAS
*Director of the United States Patent and Trademark Office*